No. 621,865. Patented Mar. 28, 1899.
J. C. SMITH.
DISK CULTIVATOR.
(Application filed Apr. 12, 1898.)
(No Model.) 2 Sheets—Sheet 2.
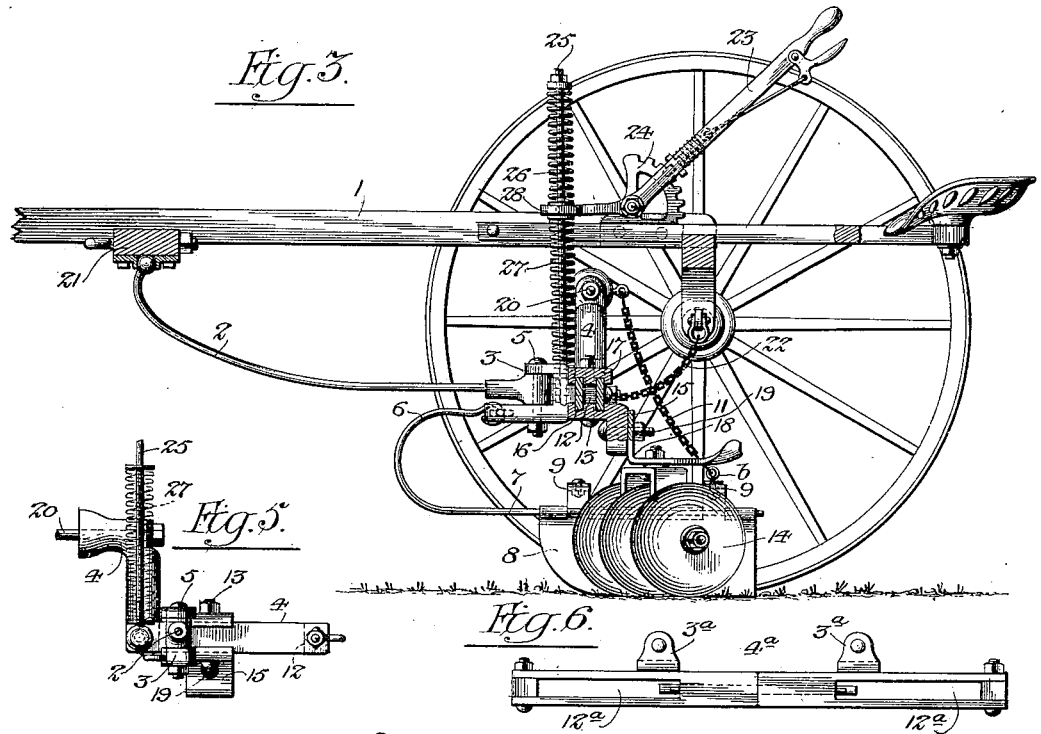
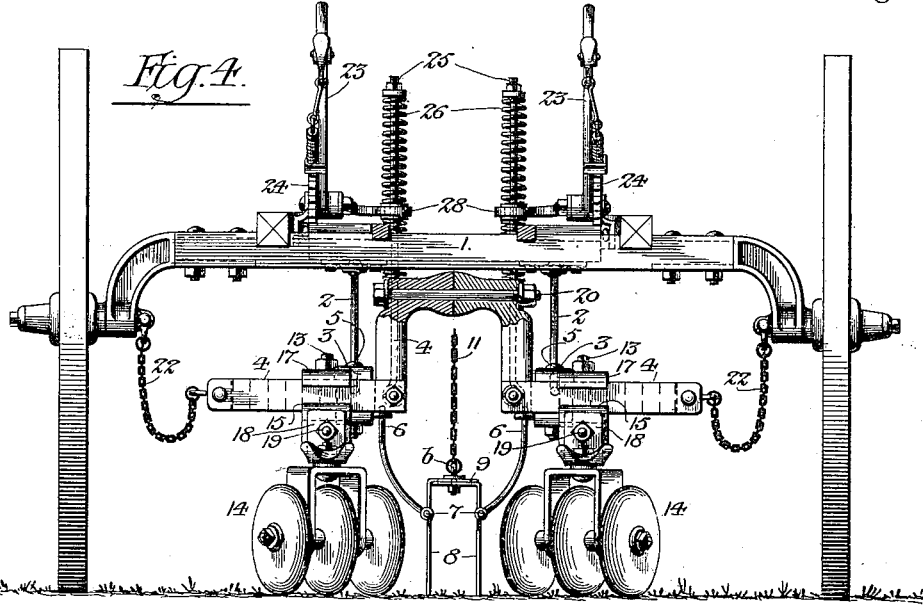
Witnesses:—
Louis M. F. Whitehead
U. B. Hillyard.
Jesse C. Smith Inventor:—
By his Attorneys,
C. A. Snow & Co.

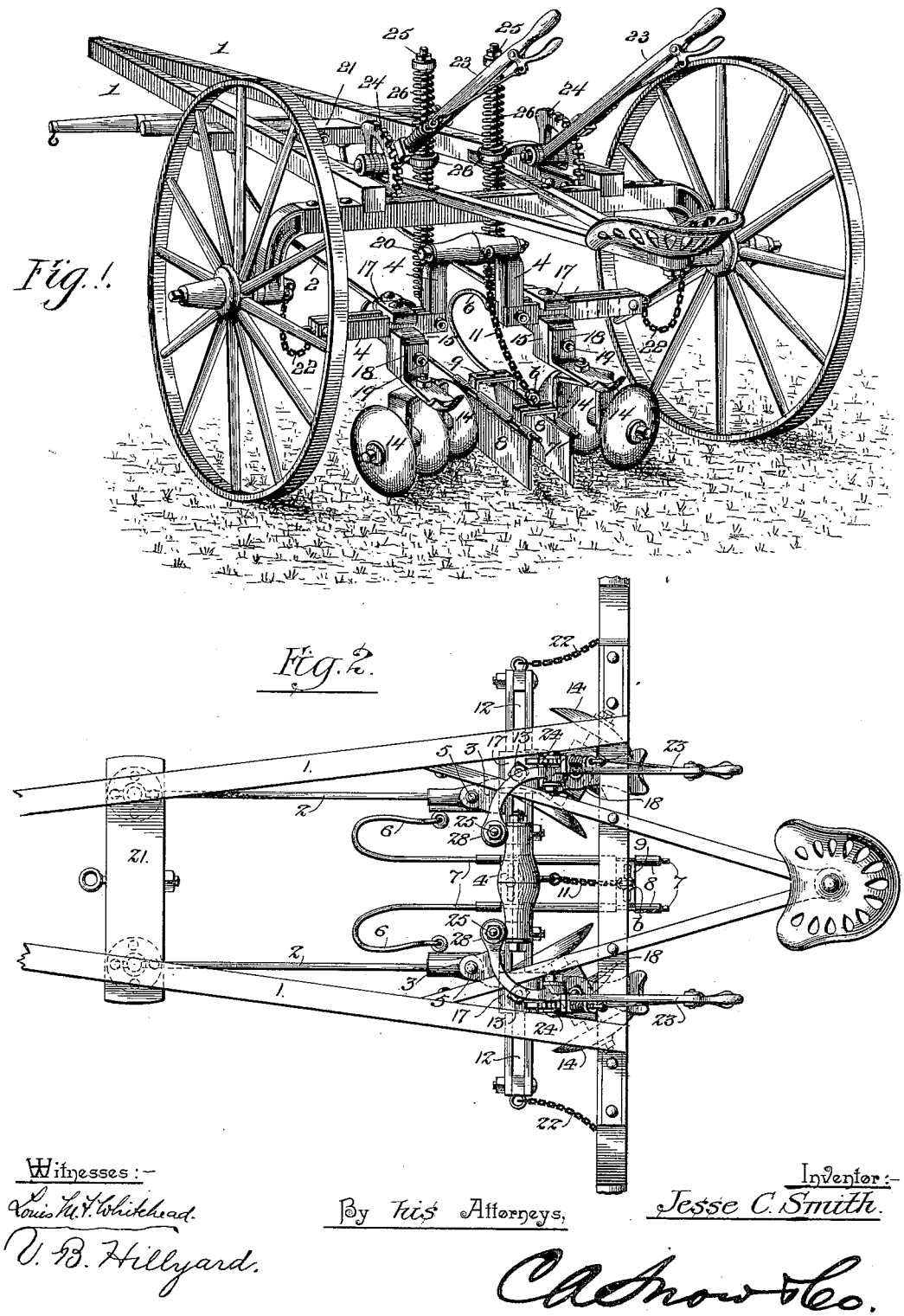

UNITED STATES PATENT OFFICE.

JESSE C. SMITH, OF SHELBINA, MISSOURI.

DISK CULTIVATOR.

SPECIFICATION forming part of Letters Patent No. 621,865, dated March 28, 1899.

Application filed April 12, 1898. Serial No. 677,336. (No model.)

*To all whom it may concern:*

Be it known that I, JESSE C. SMITH, a citizen of the United States, residing at Shelbina, in the county of Shelby and State of Missouri, have invented a new and useful Disk Cultivator, of which the following is a specification.

This invention relates to that class of agricultural implements which are designed for cultivating rows of plants and which are adapted to be adjusted to throw the earth toward or away from the plants to a greater or less degree, as may be required to meet existing conditions of soil and character of crop.

The invention has for its object to improve the general construction and to provide for obviating torsional or other strain and to enable the gangs of cultivating-disks to move so as to remain parallel to a given position at all stages of their adjustment.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a disk cultivator constructed in accordance with and embodying the vital features of this invention. Fig. 2 is a top plan view thereof. Fig. 3 is a longitudinal section. Fig. 4 is a rear view, the upper portion of the arch being in section. Fig. 5 is a front view of one-half of the arch, showing the relation of the parts connected therewith. Fig. 6 is a detail view of a different form of arch.

Corresponding and like parts are referred to in the following description and indicated in all the views of the drawings by the same reference characters.

The wheel-frame 1 may be of any desired construction and is illustrated to show the application of the present invention. The beams 2 have pivotal connection at their forward ends with a cross-bar of the wheel-frame or tongue and have loose connection at their rear ends with couplings 3, applied to the end portions of the arch 4 in such a manner as to admit of the arch and the cultivator-gangs connected therewith moving laterally and remaining parallel to a given position at all stages of its lateral adjustment. The couplings 3 may be formed with or applied to the end portions of the arch and may be of desired construction, and, as shown, they are formed with forward extensions, between which the rear ends of the beams 2 are received and connected by vertical pins or bolts 5. In the preferred form of construction the lower forward extensions of the couplings 3 project considerably in advance of the upper extensions and have the upper rearwardly-curved ends 6 of rods 7 secured thereto. The lower horizontal portions of the rods 7 are parallel and spaced apart and support fenders 8, which when the machine is in operation run on opposite sides of the plants and protect the same from injury. The fenders are connected at their upper edges by adjustable arched bars 9, the rear bar having the lower end of a chain, cord, or rope attached to the bolt *b*, connecting the sections comprising the bar, the upper end of said chain or connection 11 being secured to the middle portion of the arch 4, whereby the rear end of the fenders is supported.

The ends or horizontal portions of the arch 4 are longitudinally slotted, as shown at 12, and receive vertical bolts 13, by means of which the cultivator-gangs 14 have adjustable connection with the said arch, so as to move them to a greater or less distance apart. A bracket 15 is provided for each end of the arch and has a cultivator-gang secured thereto, and this bracket has its horizontal portion formed in its top side with transverse grooves 16 to receive the lower edge portions of the arch bordering upon the slot 12, thereby preventing any turning of the bracket upon the bolt 13 after the latter has been tightened. A yoke-plate 17 is placed on top of each end portion of the arch 4 in vertical line with the corresponding bracket 15, and its lower face is grooved transversely similar to the top side of the bracket 15 and for a like purpose. The bracket and yoke are connected by the bolt 13, as will be readily appreciated. When the bolts 13 are loosened, the brackets 15 and the cultivator-gangs carried thereby can be adjusted laterally and when properly positioned are made fast by retightening the said bolts 13. Angle-irons 18 have their horizontal portions bolted to the vertical frames of the cultivator-gangs and have their vertical members secured to the pendent portions of the bracket 15 by bolts 19. Obviously this construction admits of the cultivator-gangs being adjusted and easily removable when required.

The arch 4 is composed of two parts separable about midway the length of the horizontal portion of the arch, the parts being connected by a bolt, pin, or coupling-rod 20, which passes through openings in coincident relation in the horizontal portions of the parts comprising the arch. This manner of forming and connecting the arch admits of its end portions having independent movement and obviates torsional strain in the event of one cultivator-gang riding over an elevation or the other dropping into a depression in the surface of the ground over which the machine is advancing. The end portions of the arch will move so as to adapt themselves to the strain imposed thereon, thereby equalizing the same and resulting in prolonging the period of usefulness of the machine.

The arch $4^a$ (shown in Fig. 6) is substantially the same as the arch 4, with the exception that it is straight throughout its length, and the slots $12^a$ have their outer ends open. The separable parts of this arch are connected in precisely the same manner as the complementary parts of the arch 4. The couplings $3^a$ are similar in construction to the couplings 3, the only difference being that the horizontal forward extensions are of equal length. This style of arch is employed when it is required to throw the earth away from the plants.

The beams 2 are connected at their front ends with the cross-bar 21 in such a manner as to admit of the cultivator-gangs moving laterally and vertically, and, as shown, the connection is of the universal type, being a ball-and-socket joint. Short chains 22 connect the ends of the arch 4 with the end portions of the axle, thereby preventing the gangs from coming in contact with the ground-wheels. The cultivator-gangs are adjusted vertically in the ordinary manner by means of levers 23, fulcrumed to toothed standards 24, and provided with the usual hand-latches to engage with the teeth of the standards 24, so as to secure the parts in an adjusted position.

Vertical rods 25 have connection at their lower ends with the parts comprising the arch 4 and are provided with upper and lower springs 26 and 27, arranged upon opposite sides of arms 28, curving inwardly from the lower ends of the levers 23. These springs 26 and 27 admit of the cultivator-gangs moving up and down according to the irregularities in the surface over which the implement is drawn, thereby obviating strain and injury to the machine.

Having thus described the invention, what is claimed, and desired to be secured by Letters Patent, is—

1. In a cultivator, the combination of an arch bearing gangs of cultivating devices, couplings applied to the end portions of the arch, and parallel beams having loose connection at their front ends with the wheel-frame and at their rear ends with the said couplings, substantially as set forth.

2. In a cultivator, the combination of an arch having cultivator-gangs applied to its end portions, couplings applied to the said end portions, fenders, rods supporting the fenders and having connection with the couplings, and beams having loose connection at their front ends with the main frame and like connection at their rear ends with the aforesaid couplings, whereby the arch with the parts attached thereto can move laterally and remain parallel to a given position at all stages of its adjustment, substantially as set forth.

3. In a cultivator, the combination of an arch provided with cultivating devices, couplings applied to the end portions of the arch and having forward extensions and having the lower extensions projecting beyond the upper extensions, rods having connection with the front ends of the lower extensions of the couplings, fenders applied to the rear portions of the said rods, and beams having their front ends loosely connected with the main frame, and their rear ends similarly connected with the extensions of the couplings, substantially as described.

4. In combination, an arch having a longitudinally-slotted portion; a bracket bearing a cultivating device having transverse grooves in its top side to receive the lower edge portions of the arch bordering upon the slot thereof, a yoke-plate having transverse grooves in its lower face to receive the top edge portion of the parts of the arch separated by the slots, and a bolt or fastening passing through the slot of the arch and connecting the bracket and yoke-plate, substantially as and for the purpose set forth.

5. In an agricultural implement, the combination of an arch having an end portion longitudinally slotted, a bracket and a yoke-plate placed relatively above and below the slotted portion of the arch, a vertical bolt passing through the slotted part of the arch and connecting the yoke-plate and bracket thereto in an adjusted position, an angle-iron having its vertical portion bolted to the vertical part of the bracket, and a cultivating device applied to the horizontal portion of the angle-iron, substantially in the manner set forth for the purpose specified.

6. In an agricultural implement, the combination of a separable arch having its horizontal portions formed with openings in coincident relation, and having cultivating devices applied to the end portions of the arch, and a bolt or pin passing horizontally through said openings of the parts of the arch and loosely connecting them, substantially as described for the purpose set forth.

In testimony that I claim the foregoing as my own I have hereto affixed my signature in the presence of two witnesses.

JESSE C. SMITH.

Witnesses:
 JOHN R. LYELL,
 E. J. KING.